United States Patent [19]

Davis et al.

[11] 3,923,936
[45] Dec. 2, 1975

[54] METHOD OF FORMING AN OPEN-CELLED RESILIENT CAPILLARY DEVICE

[75] Inventors: William J. Davis, Wyomissing; Anthony J. Izbicki, Reading; Johne Parsley, Kempton, all of Pa.

[73] Assignee: MaTek Corporation, Reading, Pa.

[22] Filed: June 12, 1972

[21] Appl. No.: 262,085

[52] U.S. Cl. .................. 264/25; 101/148; 101/348; 260/2.5 L; 260/17.4 SG; 264/49; 264/50; 264/331; 264/DIG. 5; 264/DIG. 13
[51] Int. Cl.² ........................................ B29D 27/04
[58] Field of Search .......... 264/50, 49, 331, DIG. 5, 264/DIG. 13; 260/17.4 SG, 2.5 L; 101/129, 367, 148, 348

[56] References Cited
UNITED STATES PATENTS

| | | | |
|---|---|---|---|
| 2,354,433 | 7/1944 | Carter | 264/50 |
| 2,381,380 | 8/1945 | Carter | 264/50 |
| 2,575,259 | 11/1951 | Cox et al. | 264/50 X |
| 2,693,006 | 11/1954 | Shigekawa | 264/50 X |
| 2,858,282 | 10/1958 | Fairclough | 264/50 X |
| 2,875,047 | 2/1959 | Oster | 260/17.4 SG |
| 2,933,768 | 4/1960 | Morris | 264/50 |
| 3,179,607 | 4/1965 | Suda et al. | 260/17.4 SG |
| 3,215,647 | 11/1965 | Dunn | 264/50 UX |
| 3,639,312 | 2/1972 | Turner | 264/1 X |
| 3,650,995 | 3/1972 | Erickson | 264/50 X |
| 3,663,462 | 5/1972 | Arndt et al. | 264/50 X |
| 3,797,388 | 3/1974 | Kaminstein | 101/148 X |

OTHER PUBLICATIONS

Kraus, Gerard, Edt., "Reinforcement of Elastomers," New York, Interscience, c1965, pp. 102-104, 114-123.
The Condensed Chemical Dictionary, Seventh Edition, Completely revised and enlarged by Arthur and Elizabeth Rose, New York, Reinhold, c1966, p. 544.
"Syllabus of Mathematics," Revised to Jan. 1, 1914, Pittsburgh, Pa., Society for the Promotion of Engineering Education, 1914, pp. 6-8, 16, 17.
Doolittle, Arthur K., "Studies in Newtonian Flow–II–The Dependence of the Viscosity of Liquids on Free-Space," in Journal of Applied Physics, Vol. 22, No. 12, Dec. 1951, pp. 1471-1475.
Gibbs, Julian H. and Edmund A. Dimarzio, "Nature of the Glass Transition and the Glassy State," in The Journal of Chemical Physics, Vol. 28, No. 3, Mar. 1958, pp. 373-383.
Miller, A. A., "Polymer-Melt Viscosity and the Glass Transition: an Evaluation of the Adam-Gibbs and the Free-Volume Models," in The Journal of Chemical Physics, Vol. 49, No. 3, Aug. 1968, pp. 1393-1397.
Williams, Malcolm L., Robert F. Landel and John D. Perry, "The Temperature Dependence of Relaxation Mechanisms in Amorphous Polymers and Other Glass-Forming Liquids," in The Journal of the American Chemical Society, Vol. 77, July 20, 1955, pp. 3701-3707.
Miller, A. A., "Kinetic Interpretation of the Glass Transition: Glass Temperatures of N-Alkane Liquids and Polyethylene," in Journal of Polymer Science, Part A-2, Vol. 6, 249-257 (1968).
Kraus, Gerard and J. T. Gruver, "Thermal Expansion, Free Volume and Molecular Mobility in a Carbon Black-Filled Elastomer," in Journal of Polymer Science, Part A-2, Vol. 8, 571-581 (1970).
Ritchie, P. D., Edt., "Physics of Plastics," Princeton, N.J., D. Van Nostrand, c1965, pp. 222-233, 267-270.

*Primary Examiner*—Philip Anderson
*Attorney, Agent, or Firm*—Synnestvedt & Lechner

[57] ABSTRACT

An open-celled capillary device is provided to control the flow of fluids. The structure includes a resilient matrix, a plurality of cells in fluid-communicating relationship disposed within the matrix, and a plurality of capillary pores distributed over at least the working surface of the matrix in fluid-communicating relationship with the cells. In the preferred embodiment, the diameter of the pores and the diameter of the cells adjacent the working surface are smaller than are the diameters of the cells more remote from the working surface. This configuration permits effective control, both qualitatively and quantitatively, over the flow of liquid at the working surface of the matrix.

9 Claims, 4 Drawing Figures

METHOD OF FORMING AN OPEN-CELLED RESILIENT CAPILLARY DEVICE

BACKGROUND OF THE INVENTION

1. Field of the Invention

This invention relates to capillary devices for controlling the flow of fluids and, more particularly, to methods and means for dispensing fluids upon, or removing fluids from, the surface of a substrate. These devices variously may be used, for example, as inking devices to distribute, meter and otherwise control the delivery of ink to a surface or as dewatering rolls to absorb liquids.

2. Description of the Prior Art

There are many graphic arts, chemical and material-handling processes that rely upon the controlled delivery of a fluid to, or the removal of a fluid from, a substrate. In the graphic arts area, there are a myriad of applications in which ink, water or other printing fluids are transferred or otherwise delivered to a surface including letter press, gravure, lithography, offset printing or mimeographic processes. With respect to material handling, water and other fluent materials need to be removed from woven and nonwoven materials, such as in the dewatering of paper or in drying films. Common to all of these processes is a need to control the flow and distribution of a fluid at the surface being acted upon. While many devices are used for these purposes, the present invention is directed to improve capillary devices in which a resilient, open-celled, porous body, having capillary-sized surface openings, is utilized as a reservoir into which liquids can be absorbed or out of which liquids can be expressed. Basically, the improvement in capillary means here described results from controlling the size and distribution of the pores, from selectively adjusting the cellular structure, from relating the modulus of the device to its thickness, and from providing desirable physical properties on the surface. Ideally, the cellular structure, in combination with the pores of the working surface of the device, is adjusted so that fluids will be delivered to or removed from the surface upon demand, at the points of demand, and in the desired quantities. In a preferred embodiment of this invention, the capillarity of the working surface is selected so that expressed fluid, in excess of the demand level, is withdrawn from the substrate back into the cells of the device.

[For convenience in the specification and claims, the term "working surface" is used to mean the surface of the capillary device that makes contact with the substrate being treated; the term "back surface" is used to mean the surface opposite the working surface; the term "cell" or "cellular structure" is used to describe the internal voids within the capillary device; the term "pores" is used to describe the surface openings of the capillary device; and the term "windows" is used to describe the communicating openings between the several cells.]

Quite generally, prior art capillary devices of this type are lacking in sophistication and accomplish their purposes only within rather gross limits. Thus, when a conventional open-celled rubber foam is used to dispense a fluid onto a surface, the rate at which the fluid is expressed may be erratic and the distribution of the fluid over the surface may not be uniform.

Uniformity in the amount and distribution of a fluid expressed from (or absorbed into) a capillary device can be improved by reducing the size and increasing the number of the cells and pores. There are practical limits to this approach, however, since the impedance to the flow of fluid will increase as the capillaries become smaller, which, in turn, will adversely affect the flow of fluids through the device and their delivery to, or removal from, the substrate. Also, from a mechanical standpoint, there is a practical limit as to the volume of the cells (open volume) that can be incorporated into a capillary device without loss of resiliency and strength.

By one prior art process, capillary devices, such as inking rolls, have been made by pressing and sintering fine powders. In these processes, a limited degree of control can be exercised over the size and distribution of the individual cells by adjusting such factors as the diameter of the powder particles, the compaction pressure, the temperature used for sintering, and the modulus of the powdered material. Even when control is exercised over these variables, flexibility in selecting desired cell size and distribution is limited.

Another prior art method for making capillary devices relies upon foaming a liquid material, such as a prepolymer, either mechanically or chemically. The foamed liquid is then converted into a porous solid body as by curing, polymerization or the like. It is difficult to achieve cells of uniform size and configuration in these processes, and, if fine cells are desired, particularly at higher densities, it is difficult or impractical, by direct means, to obtain an open foam with fluid communication between adjacent cells. Open foams are generally characterized as being of very low densities with large, irregular pores and cells.

Capillary devices in the prior art also have been manufactured from woven and nonwoven fibrous materials such as cloth pads, felts and the like. These frequently prove to be unreliable in moderately critical applications in that they neither meter fluids well nor do they distribute them effectively. This can be best illustrated with respect to mimeographic-type duplicating processes. These processes make use of a waxed paper stencil or thin polymeric sheet into which the text or pictures to be reproduced has been cut through the wax as by a typewriter, stylus or electric arc. The stencil is fastened to a perforated portion of a metal drum that contains ink within its interior. As the drum and stencil are rotated downwardly into contact with a piece of paper moving through a nip formed by a roller riding in contact with the rotating drum, ink passes through the perforated portion of the drum, through the open spaces of the stencil, and onto the paper. To obtain some degree of control over the ink that is fed to the stencil and prevent flooding, a fibrous mat or pad is interposed between the perforated portion of the drum and the stencil. The purpose of this is two-fold. First, the fibrous mat, by its wicking action, distributes ink flowing through the openings in the drum over the entire back surface of the stencil. Secondly, the mat impedes the ink from flowing freely through the openings in the drum and flooding the stencil with excessive quantities or ink. Thus, the mat or pad acts as a passive element to intercept the ink and diffuse it over the back of the stencil.

There are numerous problems inherent in the use of these fibrous ink pads. Perhaps the most annoying of these lies in the fact that a fabric pad having a sufficiently open weave to permit delivery of required quantities of ink to the stencil will not have the ability to retain ink over gravitational forces and storage conditions. Thus, when a mimeograph machine is shut down, it is necessary to remove the stencil and fit an impervious protective cover over the fibrous pad to prevent ink from leaking out. If this is not done, ink will run out of the pad and deposit itself over the surface areas of the machine and, frequently, upon the operator who is trying to manipulate the device.

It is not practical to construct a fibrous ink pad so that it can retain ink without leaking for, in this case, the pad will not deliver sufficient ink under many conditions. For example, even with the pads currently used, if the stencil has a high proportion of open (cut-through) areas, it may be necessary to run at minimum speeds and, even then, the feed of ink may be insufficient to make many copies before the print begins to tail off. With difficult stencils (that is, relatively large open areas), this effect may be observable after only ten or so copies have been run, and with comparatively easy stencils (that is, relatively little open area), the effect may be observable after several hundred copies have been run. If the machine is momentarily stopped to allow the pad to re-establish its normal reservoir of ink, gravity forces will assert themselves and cause ink to begin running onto the surface areas of the machine.

A further problem encountered with prior art capillary devices, particularly fiber pads, lies in their tendency to cause chromatographic separation, that is, separation of the pigment or other solids from the liquid vehicle. In the case of mimeograph inks, the pigment (carbon black) is carried in an oil/water emulsion. Since the oil component and the water component have different affinities for the cellulosic fibers, a breakdown in the emulsion may occur. When this breakdown does occur, the pigment particles are deposited upon the fibers. The initial effect is to reduce the color intensity of the ink and the ultimate effect is total loss of the fiber pad's ability to transmit fluids.

SUMMARY OF THE INVENTION

Accordingly, it is an object of this invention to provide improved capillary devices and methods for their manufacture.

It is another object of this invention to provide improved capillary devices and methods for their manufacture that are adapted to deliver fluids to, or remove fluids from, a surface.

Another object of this invention is to provide a capillary device that has high surface capillarity combined with high storage capacity and comparatively low impedance to the flow of fluid through the capillary device.

Another object of this invention is to provide improved capillary devices and methods for their manufacture that have reduced tendencies to break down emulsions and cause separation of solids suspended in the emulsions.

Another object of this invention is to provide an improved capillary matrix as an intermediate storage device for delivering fluids to a surface upon demand.

Another object of this invention is to provide an improved capillary matrix for the controlled delivery of fluids to a surface.

Another object of this invention is to provide a capillary device that will freely deliver fluids on demand and reabsorb fluids delivered in excess of the immediate demand level.

Another object of this invention is to provide a new printing device.

These and other objects of this invention are achieved by forming a capillary device in which the diameter of the pores and of the cellular structure adjacent the working surface are small as compared with the cellular structure more remote from the working surface. Ideally, a conical gradient is established in the size of the cells in a manner in which the cells more remote from the working surface become progressively larger. One method by which this result may be achieved is by aerating or otherwise foaming a liquid suspension of an elastomeric polymer, casting the foam into an appropriate configuration, heating the foam in a manner that rapidly removes liquid from the surface of the foam to develop and set (rigidify) the surface structure first, continuing the heating to remove liquid from the interior of the foam and to permit the voids to expand, and finally curing the polymer, when appropriate. By setting the surface area immediately, the configuration of the foam is determined in such a manner that the pores and cells formed adjacent the working surface of the capillary device are substantially as cast, whereas the cells in the interior are somewhat larger since they have had time to expand, coalesce, and otherwise grow in size before rigidification. By providing a tapered cellular structure that is finer at the surface than at the interior, it has been found that the capillary device will uniquely combine properties of high surface capillarity, high fluid storage capacity and low impedance to the flow of fluids.

DESCRIPTION OF THE DRAWINGS

In FIG. 1 there is shown a capillary device made in accordance with this invention that may be used for either delivering a fluid to, or removing a fluid from, a surface. The capillary device is generally designated by the numeral 1 and it is shown as being mounted upon a porous rigid support member 2. The working surface of the capillary device is comprised of a number of evenly distributed, comparatively small pores 3. Underlying the pores 3 are a series of interconnected cells 4 that are progressively larger the more remote they are from the working surface, terminating on the back surface with a plurality of still larger cells 5 and pores 5a. The capillary device 1 is supported on a nonyielding, fluid-pervious, reticulated structure 6, such as a screen, that has openings preferably larger than the pores 5a on the back side of the capillary device. Immediately below the nonyielding reticulated structure 6 is a second fluid-pervious reticulated structure 7 having openings equal to or larger than (as shown) the openings of the overlying reticulated structure 6.

Figure 1:
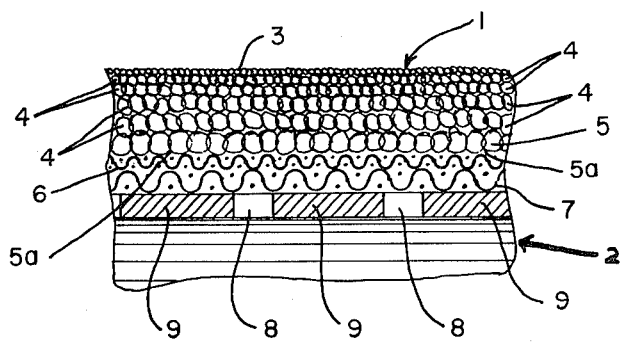
FIG. 1 is a schematic view, in section, of a portion of a capillary device made in accordance with this invention mounted on a perforated rigid support member.

The entire capillary device is mounted upon a nonyielding support member 2 (for instance, the drum of a stencil-printing machine) which comprises a cylinder 9 (or, in some applications, a flat or slightly curved plate)

carrying a plurality of orifices 8. As illustrated in FIG. 1, the reticulated structures are the screens 6 and 7 although a similar benefit can be obtained by scoring the surface of the cylinder 9 with a plurality of lines (not shown) to form the functional equivalent (improved lateral distribution of liquids) of either one or both of the reticulated structures 6 and 7.

Figure 2:
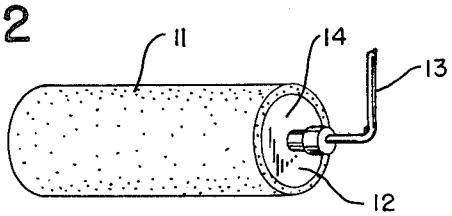
FIG. 2 is a perspective view of a cylindrical capillary device made in accordance with this invention.

In FIG. 2 there is illustrated a device made in a manner similar to that shown in FIG. 1 wherein the capillary device is in the configuration of a hollow cylinder. A capillary device 11 is supported on a rigid, hollow, cylindrical, perforated support member 12. An end bell 14 is attached in fluid-sealing relationship to the support member 12. A conduit 13 is provided either to deliver or remove fluids from the interior of the rigid support member 12.

Figure 3:
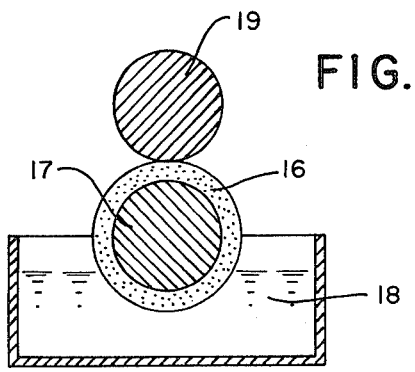
FIG. 3 is a schematic view, partially in section, of a capillary device adapted to deliver a controlled quantity of fluid to a surface.

FIG. 3 illustrates a method for practicing this invention wherein the capillary device is utilized to deliver a fluid to a surface and the working fluid is replenished to the capillary device by external rather than internal means. Here the capillary device is fitted around a rigid support member 17 which, in turn, is journaled for rotation. As the support member 17 rotates, the capillary device 16 is immersed in a liquid bath 18 where liquid is absorbed. As the rotation continues, the device 16 is brought into contact with a roll 19 upon which at least a portion of the absorbed liquid is expressed.

Figure 4:
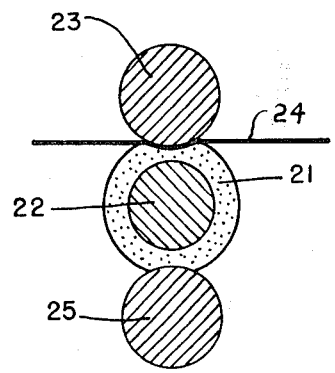
FIG. 4 is a schematic view, partially in section, of a capillary device adapted to remove fluids from a surface.

FIG. 4 illustrates a means for utilizing the invention as a dewatering device. A capillary device 21 is mounted in surrounding relationship with a cylindrical rigid support 22 that is mounted for rotation. The material to be dewatered, such as a paper or cloth web, is continuously advanced between the nip of the capillary device 21 and a roll 23. After the capillary device has absorbed liquid from the web, it rotates into contact with a hard roll 25. The roll 25 squeezes the liquid that has been absorbed out of the capillary device. If the rigid support member 22 is hollow and perforated, it may be placed in communication with a vacuum device leading to its interior (see FIG. 2) in order to remove liquid from the interior of the rigid support member 21.

DESCRIPTION OF THE CAPILLARY DEVICE AS USED FOR AN INK PAD ON STENCIL-PRINTING MACHINES

From the foregoing description, it can be appreciated that the capillary device of this invention may be used as elements in many processes. Rather than discussing many of these processes briefly, it is thought more appropriate to select a single application for the capillary device of this invention as being representative of its function and to describe the application in detail. For this purpose, an ink pad for a stencil-printing machine, as referred to above, has been selected as being illustrative of the typical operation and advantages that accrue in the use of the device of this invention; it being noted, however, that the invention is not intended to be limited to such use.

A typical fabric ink pad for use in a stencil-printing machine is not truly a working element in the sense that it only performs the passive functions of intercepting the ink from the drum and diffusing it laterally for delivery to the back surface of a stencil. In contrast, the capillary device of this invention, when substituted for a conventional ink pad, becomes a working element and dynamically performs as an intermediate reservoir and a capillary pumping matrix. In addition to acting as an intermediate reservoir of ink and ensuring lateral flow of ink from the drum to the stencil, the capillary device of this invention buffers the print from the flow of ink. Due to the high capillarity of the device, ink will not flow from the pores of the working surface by gravity, but will be expressed therefrom only when the device is compressed in the nip between the drum and the roller. Since the capillarity of the pores of the working surface of the capillarity device is high, excess ink that may be expressed onto the surface of the paper will be reabsorbed by the device when the pressure of the nip is released. The fine pore structure believed responsible for this reabsorption of excess ink not only prevents smearing, but also has surprisingly been found to produce printed copy of higher resolution than can be obtained with conventional prior art devices.

Between cycles, and when the machine is not being used, the capillary forces of the pores are sufficiently high to retain a reservoir of ink within the pad without migrating to other places as by dripping onto surface areas of the stencil-printing machine. Thus, when not in operation, it is unnecessary to remove a stencil and place an impervious cover over the pad. The small diameter of the surface pores is also advantageous in protecting the ink from degradation.

Small pores yield high capillary forces and are generally associated with low storage volume. However, despite the high capillary forces of the small pores of the device of this invention, an adequate ink supply is readily maintained due to the progressively increasing size of the cellular structure away from the working surface. These larger cells make it possible to hold an adequate reservoir of fluids, to transmit fluids at a useful rate, to reduce the over-all impedance to the transmission of fluids through the device to low levels, and to obtain a rapid lateral distribution of the fluids.

With reference to the lateral distribution of ink, reference is made to FIG. 1 wherein the openings of the drum are spaced fairly far apart. Typically, in a stencil-printing machine of the mimeographic type, these openings occupy only about 25% of the surface area of the drum. Thus, in order to achieve a rapid and uniform lateral distribution of the ink throughout the capillary device, it is important that the pores on the back surface of the device be comparatively large. Lateral distribution can further be improved upon by providing a nonyielding, fluid-conducting, reticulated structure either by scoring the surface of the drum, or by positioning a comparatively nonyielding member, such as a screen, intermediate the back surface of the capillary device and the surface of the drum. By these means, a high lateral flow of ink on each pumping cycle can be maintained so that there will be no starvation of the supply of ink to the stencil and the intensity of the printing can be maintained at a high level.

It was mentioned above that the various fibers of a cloth inking pad can cause chromatographic separation of the pigment that results in decreasing print intensity and eventual blinding of the pad. A capillary device constructed of resilient materials in accordance with this invention does not suffer from this disability since the preferred materials (elastomers) do not seem to have any adverse effect upon the pigment-carrying emulsion.

Another reason that may contribute significantly to the fact that the pores and cells do not appear to become obstructed lies in the tapered configuration of the cells in which the cells are of largest size adjacent the back surface. Accordingly, when a pressure force is applied to the working surface of the capillary device, ink is displaced toward the back surface of the device, thus "back flushing" the device and removing solids that might have accumulated in the smaller pores and cells at the working surface of the device.

It is important in the practice of this invention that the matrix of the capillary device be made of a resilient material. This permits the device to return to its original configuration after it has been compressed to displace fluids. For example, in a stencil printing machine, a pumping cycle is established that causes fluid to be expressed when the capillary device is compressed and fluid to be absorbed when the stress is relieved. The fluid that is absorbed may be both excess ink laid down on the printed substrate and ink stored within the drum.

The modulus of elasticity and the thickness of the capillary device must be selected with regard to each other while considering the amount of fluid to be transmitted. For example, if a device has a low modulus or deforms readily, a comparatively thin pad will deliver fluids to a substrate at a rate similar to a thicker device of higher modulus when similar stresses are applied.

In striking a balance between the thickness and modulus of capillary devices for stencil-printing machines, consideration should also be given to the stencil that is to be placed in contact with the surface of the capillary device. As the modulus decreases and the thickness increases, the strain upon the device will increase in operation. If in so doing the stencil is strained beyond its elastic limit, distortion in the printed copy, such as lack of registry and line sag, will result.

The frictional characteristics of the working surface of a capillary device play subtle but sometimes critical role. When a mimeographic stencil is placed in contact with an ink pad, it is preferred that the surface of the pad permit relative movement between it and the stencil. This frees the stencil to return to its original configuration after it has been strained as by passing through the nip, if the elastic limit is not exceeded. It has been found that the surface friction of the capillary device may be modified by proper formulation of the polymers of which it is comprised.

The capillary device should also be thin enough so that it does not offer an unduly high impedance to the flow of ink, but, on the other hand, it should be sufficiently thick to provide an adequate reservoir of ink and a lateral flow pattern of the ink. With respect to this latter point, it can be understood that the geometry of a thick device makes it possible to obtain lateral distribution of the ink through the pad with more facility than with a thin device. This is true since the cone of distribution of ink from the openings in the cylinder at the opposite surface (apex) to the working surface (base) must necessarily have a higher cone angle with thin devices than with a thicker device.

Summarizing the above, in designing capillary inking devices having optimized characteristics for use with stencil printing devices, one must consider the modulus, thickness and surface characteristics of the pad. The capillary device must be thick enough to provide an adequate reservoir of ink and to facilitate lateral flow of ink; the device must have sufficiently low impedance to keep the flow rate of ink at reasonable levels; the pad must have a modulus which, taken in combination with the thickness of the pad, will not distort the stencil beyond its elastic limit; and the pad should have a slippery surface with respect to a stencil.

The above capillary devices for stencil-printing machines have been described in the context of conventional practice in which stencils are first cut and then removably positioned over the capillary device. It has now been found that the stencil may be made as an integral part of the capillary device by providing an impervious, frangible layer over the working surface of the device. This impervious layer may be formed from the device itself or may be applied to the working surface as a coating or laminate. For example, an impervious surface can be formed from the capillary device by heating the working surface of the pad to seal the pores. Alternatively, a coating may be applied to the working surface by flowing a coating material onto the working surface or by adhesively affixing a film.

Once an impervious frangible layer has been formed on the surface of the capillary device, it may be impacted, as by mechanical, chemical, electrical or electromechanical forces, to provide open areas through which fluids may be expressed. Particularly useful devices for impacting the stencil are electronic stencil cutters that rely upon photoelectric scanning of the copy and electronic impacting of the stencil. Also particularly useful is pulse modulation of and scanning with a laser beam.

There are many advantages gained in forming the stencil and capillary device integrally since, as the stencil is fixedly adhered to the capillary device, dimensional stability and freedom from distortion improve, and finer and sharper images can be cut on the stencil and reproduced. Of particular significance is the fact that the stencil is sealed to the capillary matrix. Thus, when the matrix is compressed, fluids must flow through the openings in the stencil (as opposed to the lateral flow that may take place at the interface between the stencil and a standard ink pad) in an exact metered amount as controlled by the amount by which the capillary matrix is strained.

METHOD OF THE INVENTION

In the preferred practice of this invention, capillary devices are prepared by dissolving a rheological modifying agent in a liquid suspension of polymer, aerating the mixture, forming a shaped mass in a desired configuration, immediately rigidifying the surface of the mass by removing liquid therefrom, sequentially rigidifying the interior of the mass by the continued removal of liquid under conditions that permit the voids to expand, curing the polymer when appropriate, and removing the rheological modifying agent.

Capillary devices made in accordance with the above procedure are unique in that a gradient size of cells can be provided for throughout the cross section, and large windows can be opened between the cells. Conventionally, it is difficult to obtain a fine pore and cell size coupled with an open-celled foam. Essentially, many open-celled foams are prepared by introducing sufficient air to blow the cells to such a large size that the windows burst like soap bubbles. Unfortunately, when this degree of blowing is utilized, control over the uniform size and shape of the pores and cells cannot be obtained, it is not possible to develop fine pores on the surface, and the density of the foam is usually comparatively low.

In the practice of the instant invention, the use of radiant heat has proven to be a convenient means for immediately rigidifying the surface of the capillary device while the interior is still mobile. It has proven particularly effective to impose a high level of radiant energy to the surface of the capillary device for a comparatively short duration of time and then to reduce the level of the radiant energy and continue the liquid removal and final cure of the device at a somewhat slower rate.

Rheological modifying agents are used in the preferred method of this invention. It is true that capillary devices can be made by the method of this invention without the use of rheological modifying agents, but such agents greatly facilitates obtaining the desired configuration of the pores and cells in the capillary device.

While the function of the rheological modifying agent is not well understood, certain observations can be made. First, the agent acts as a thickener and modifies the physical properties of the foamed liquid mixture. Second, it is believed that the rheological modifying agents reduces the time required to rigidify the foamed mixture. This apparently results from the fact that the presence of the rheological modifying agent permits rigidification at comparatively high liquid levels in the mixture. Third, in a more speculative vein, it is believed that the rheological modifying agent plays a role in the development of the open-celled structure. In accordance with this theory, it is believed that as liquid is being removed from the mixture, the rheological modifying agent concentrates at the incipient windows. It can be visualized that as the mixture is dried, the concentration of polymeric materials becomes higher and higher and the individual particles are brought into closer and closer contact with each other. Eventually these polymeric particles will agglomerate and, at that time, will displace much of the liquid from between them due, at least in part, to a net driving force resulting from the lowering of their free surface energy. The liquid that is displaced moves into other areas where the density of the particles is lower which, it is believed, are the areas where the windows develop. When the mixture is finally evaporated to dryness, the rheological modifying agent will tend to concentrate in those regions where the density of the polymer is least, and, after the structure of the rheological modifying agent crumbles or is crumbled or is leached away, windows will be opened between the cells to form a desired open-celled capillary structure having comparatively large windows interconnecting the cells.

It has generally been found most convenient to utilize as the polymeric material for the capillary device various latices such as those of natural and synthetic rubbers, vinyls, acrylics, etc. This places a fundamental limitation on the rheological modifying agent in that it must not cause coagulation of the latex when dissolved therein. The second important property of the rheological modifying agent is that it be readily soluble in the latex in comparatively large percentages — as amuch as 100% by weight solids — and also be readily leachable after the foamed mass has been rigidified. Other advantageous properties of the rheological modifying agent are such as being nontoxic, readily available, inexpensive, recoverable, and the like. The materials that best meet these criteria are the saccharides and soluble low molecular weight cellulosics which will hereafter simply be referred to in the specification and claims as "sugars."

In addition to the above effects of the rheological modifying agent, it is known that when it is added to a latex, it may cause an apparent increase in the glass transition temperature of the polymer. When this occurs, the rigidified foamed structure is rendered quite brittle and closed windows between the cells can be readily fractured. The polymeric material may be restored to its normal resilient condition by simply leaching out the rheological modifying agent.

In somewhat more detail, according to accepted qualitative and quantative investigations of the glassy state, a glassy state can be induced thermally by a reduction of the thermally available degrees of volumetric freedom of a polymer to a point where long-range cooperation between segments of polymer molecules cannot occur. This result can be thermally effected by reducing the free volume to a point at which the long-range cooperative motions are extinguished. At this point, the so-called glass transition temperature is reached at which temperature the polymer, even if it is a naturally elastomeric one, will become glassy and more friable.

As an alternative approach to inducing a glassy state, an elevated temperature (as used herein, "elevated temperature" is used to mean a temperature substantially above the glass transition temperature of the polymer and preferably one which approaches ambient temperature) is maintained but the movement of the polymer is subjected to a mechanical restriction by filling the free volume of the polymer with a form-stable material. The observed effect is the same as cooling the polymer to its glass transition temperature. Free volume, from a thermal point of view, is considered as a reference point at which configurational entropy vanishes while, from a mechanical point of view (i.e., filling free volume), it must be considered as the nonoccupied volume in excess of the van der Waal's volume of the atoms in the polymer. These configurations lead to the following equation that relates parts by weight of intramolecular filler directly to parts by weight of polymer needed to raise the temperature at which a glassy state is observed a given amount when the filler is introduced intramolecularly.

$$\frac{\text{parts by weight filler}}{\text{parts by weight polymer}} = \frac{\frac{(Tge - Tg)(0.116 \text{ cc/g})}{Tg} + V_s(Tge) - V_w}{V_{fill}(Tge)}$$

where  Tg = normal polymer glass transition temperature (absolute)

Tge = elevated temperature (absolute) at which a glassy state is desired $V_s$(Tge) = specific volume of the polymer at Tge $$\frac{1}{\text{density}}$$

Vw = van der Waal's specific volume of the polymer chain (this can be calculated from atomic volume data and known polymer composition or used as 0.769 cc/g for a wide variety of polymers containing carbon, nitrogen, oxygen and hydrogen atoms)

$V_{fill}$ (Tge) = specific volume of filler at Tge $$\frac{1}{density}$$

For example, calculations made in accordance with the foregoing yield the following values:

| Polymer | Filler | Tg (°k) | Tge (°k) | Vs (Tge) | ppw Filler / ppw Polymer |
|---|---|---|---|---|---|
| (CH$_2$) | Sugar[1] | 212 | 300 | 1.043 | 0.65 |
| Amorphous[3] nitrile rubber | Sugar[1] | 247 | 300 | 0.961 | 0.342 |
| Natural[4] rubber | Sugar[1] | 200 | 300 | 0.987 | 0.435 |
| Nylon 6[5] | Ortho-[2] boric acid | 243 | 300 | 0.823 | 0.116 |
| Nylon 11[6] | Ortho-[2] boric acid | 203 | 300 | 0.875 | 0.233 |

Assumptions:
1. $V_{fill}$ (Tg) = 0.633
2. $V_{fill}$ (Tge) = 0.696
3. Hycar 1512, B. F. Goodrich, density at Tge = 0.986
4. Density at Tge = 0.98
5. Density at Tge = 1.13
6. Density at Tge = 1.04

In support of the foregoing concepts, it is consistent with accepted theory that Tg is an iso free volume condition [Fox and Flory, J. App. Phys., 21, 581 (1950); Fox and Flory, J. Am. Chem. Soc., 70, 2384 (1948)]. This being true, it follows that an apparent Tg will be observed whenever the free volume ratio is reduced to a specific value. One value derived for the free volume ratio at Tg is 2.5% which, when empirically evaluated for a wide variety of systems, led the above researchers to the belief that near Tg, the macroscopic effects follow from universal mechanistic interactions. From this it was logically concluded that near Tg there is a universal function in which the rates of the processes depend on temperature only through its effect upon the free volume [Williams, Landel and Ferry, J. Am. Chem. Soc., 77, 3701 (1955)].

Later theoretical investigations by Miller [J. Chem. Phys., 49, 1343 (1966)] and Eisenberg and Siato [J. Chem. Phys., 45, 1673 (1966)] showed correspondence between phenomenological free volume theory and the mechanistic Gibbs-Dimarzio theory for a free volume ratio at 3.6% at Tg which is in satisfactory accordance with the empirical value of 2.5%.

In considering the intramolecular filling, to effect an apparent increase in Tg, it is important to distinguish between this phenomenon and those which occur through the use of plasticizers, antiplasticizers and solid fillers as known to the prior art. As discussed above, plasticizers will have the effect of softening the polymer, modifying the stress/strain curves, improving crystallization resistance, increasing low temperature flex and reducing the brittle temperature (Tb). Anti-plasticization involves filling a polymer to increase tensile modulus and tensile strength with reduction of ultimate elongation and impact strength. Plasticizers exhibit this phenomena at low concentration, and both plasticizers and antiplasticizers reduce the brittle temperature. While the free volume theory is applicable to these systems, it must be recognized that the brittle temperature is reduced and is correlative with an increase in free volume.

The concept of intramolecular filling to increase Tg has not been previously recognized. There are a few literature references wherein it is reported that some increase in Tg is obtained when fillers are added, but there is no recognition of the geometry of the volume increments to be filled and the requirements placed upon the properties of the filling material. Quite simply, the macroscopic size of the fillers that are available for use with polymers, as compared with the volume increments to be filled, is such that the filler cannot fit within the voids and fill the free volume without disrupting molecular configuration. For ease of understanding, "filling" as is recognized in the prior art may be viewed as an "inter"molecular filling as opposed to the "intra"molecular one utilized in the practice of this invention. For example, it has been reported that an extremely fine carbon black (HAF) having a particle size of 26 to 29 millimicrons raised the Tg of an SBR rubber only 0.2°C for every 10 pph by weight of carbon black added [Kraus & Gruver, J. Polymer Sci., part A.2, 8, 571 (1970)]. This is consistent with the free volume theory here set forth if consideration is taken of the fact that the volume increments to be filled have an upper value in the order of from 0.2 to 2 millimicrons [Miller, J. Chem. Phys., 49, 1343 (1961)]. Thus, as practiced in the prior art, fillers are so large compared to the voids between molecules so as to cause reorientation of the polymer chains in contrast to the intramolecular filling of this invention that does not disrupt the normal orientation or configuration of the polymeric molecules. Even in the unlikely event that a few filler particles, such as carbon black, were to be incorporated into the natural structure of the polymer molecules, these fillers are sufficiently large in comparison with the polymer molecules that a reduction of free volume to a value near that of the glassy state is not physically realizable.

Materials which are capable of obtaining the desired intramolecular filling are here termed form-stable materials - these being defined as materials that are sufficiently rigid so that, when unconfined, they will maintain their shape, at least under low to moderate stresses such as may be imposed by their own weight, if they are of reasonable size. These form-stable materials, most importantly, must be sufficiently small in size so that it is possible to fill the empty volume of a polymer to a point at which there is an apparent increase in the glass transition temperature. Of the form-stable materials presently known, the saccharides and low molecular weight cellulosics are the most convenient to use, and thus it can be appreciated that the rheological modifying agent of this invention is not only responsible for changing the rheological properties of the aerated mixture before and during the time it is rigidifying, but it also acts as a form-stable material to cause an apparent increase in the glass transition temperature of the foamed material after all of the liquid has been removed.

It is important to note that the above-stated theories are not mutually exclusive, but their effects may be additive in obtaining the desired capillary structures of this invention.

As previously noted, in conducting the process of this invention, the air bubbles in the latex have a degree of mobility that causes them to migrate and coalesce. To some extent, this action is modified by increasing the viscosity of the latex by dissolving a form-stable material in the latex, but if the foamed latex is allowed to stand for any length of time before it is cast into a pad or other shape, the gas bubbles will coalesce and increase in diameter. This phenomenon may be used to considerable advantage by causing the cast shape to rigidify at different points in time throughout its cross section. This is a comparatively simple thing to accomplish since rigidification is a function of vaporization of the water from the latex and the rate of vaporization can be controlled by the type of heating and the temperatures that are used. Thus the surface of the cast foam may be rigidified almost instantly while keeping the interior of the foam mobile for a somewhat longer period of time, if high-energy radiant heating is used. If the foam as cast contains small bubbles, the size of these bubbles can be maintained at the surface to define openings of high capillarity. Since the interior of the foam can be controlled to rigidify over a somewhat longer period of time, the small bubbles in the foam are given an opportunity to coalesce in larger bubbles prior to rigidification. Since the interior of the foam remains mobile during the initial stages of heating, the bubbles will also increase in size by thermal expansion. Thus, a monolithic elastomeric foamed structure can be made that has large internal fluid capacity, a low impedance to the flow of fluids, and a high surface capillarity.

The surface of the ink pad so produced, particularly those made mostly from rubbers, may have an undesirably high coefficient of friction that may cause the stencil to be pulled and so distort the reproduced image. It has been found that the surface characteristics of the ink pad can readily be controlled by selection of the polymer or copolymers that are used. For example, capillary devices for use on stencil-printing machines made from a nitrile rubber latex were found to have objectionably high surface friction when used in combination with certain stencil materials. However, when 25 parts (by weight) of a vinyl latex was added to 75 parts of the nitrile rubber latex, an acceptable surface was obtained that would not interfere with the movement of the previously mentioned stencil materials. As examples of suitable polymers that may be used in this process, common examples include natural and synthetic rubbers, urethanes, vinyls, acrylics, halocarbons and the like.

EXAMPLE I

The following ingredients were dispersed using a three-blade propeller mixer. As used herein and elsewhere, all parts of active ingredients are by weight on a solids basis unless noted otherwise.

- 55 parts synthetic anionic acrylonitrile copolymer latex (Hycar 1512, B. F. Goodrich)
- 25 parts medium hard unplasticized synthetic anionic vinyl chloride copolymer (Geon 352 B. F. Goodrich)
- 20 parts soft synthetic anionic vinyl chloride copolymer plasticized with 35 parts per 100 parts resin with dioctylphthalate (Geon 576, B. F. Goodrich)
- 1 part primary dispersing agent (Daran 7, R. T. Vanderbilt)
- 1.7 parts antioxidant (Age Rite White, R. T. Vanderbilt)
- 2 parts carbon black pigment and infrared absorber (P-33, R. T. Vanderbilt)
- 5.23 parts zinc oxide curing agent (R. T. Vanderbilt)
- 2.02 parts sulphur curing agent (R. T. Vanderbilt)
- 1 part ethyl zymate curing agent/accelerator (R. T. Vanderbilt)
- 1 part curing agent/accelerator (Zetax, R. T. Vanderbilt)
- 1.18 parts thickener (Natrosol 250 HXR, Hercules)
- 60 parts sugar as the rheological modifying agent Mixing of the above formulation was continued until a viscosity of approximately 25,000 centipoise was developed. At this time the mixture was filtered through several layers of cheesecloth to remove any large agglomerates.

A planetary whisk was inserted into the mixture and air was beaten into it until its density was reduced to about 0.32 g/cc. Similar results can be obtained, for example, by using an Oakes frothing head.

After aeration of the mixture, a 77 mil (wet) coating was laid down using a knife-over roll coater onto an 18 × 16 (warp by filling) vinyl-coated Fiberglas screen (Chicopee Mills). Underlying the Fiberglas screen was a 64 × 46 cotton fabric weighing 1.3 oz/sq.yd. which performed the function of allowing the aerated mixture to strike through the screen. This underliner is also of utility since it presents a permeable surface to allow moisture and vapors to escape from the bottom side of the screen during the drying and curing cycles.

Immediately upon application of the coating, the aerated mixture was introduced into an infrared radiant heat oven to rigidify the surface and begin the development of the tapered structure of the cells. In this development cycle, the film was positioned approximately 18 inches below the grid of a 100,000 BTU gas infrared heater and was held there for about 90 seconds. During this time the surface structure was set and some of the cells within the matrix began to rigidify.

The film was then introduced into a curing cycle where it was positioned 4 feet below the grid of a similar infrared heater for a period of about 7 minutes. During this curing cycle, all of the cells in the film were rigidified, all of the water was removed, and the nitrile rubber polymer was cured.

At the time of its removal from the oven, the rigidified structure was extremely brittle. This was due to the fact that, as mentioned above, the apparent glass transition temperature of the structure is above ambient due to the presence of the sugar which acts as a form-stable intramolecular filler. It is thus important to leach out the sugar before the matrix is excessively handled. This can conveniently be done by immersing the matrix in a water bath, preferably at slightly elevated temperatures such as, for example, 130°F.

The matrix is then dried and, while still warm, the fabric underliner is stripped from its bottom surface. Capillary devices for use on stencil-printing machines can be conveniently fabricated from a matrix so developed simply by cutting it to size, attaching suitable clips, and positioning it on the cylinder of a stencil-printing machine. In order to prevent ink from leaking out of the sides of the ink pads so formed, the edges are folded back and sealed along the margins. A second backing screen, such as the Fiberglas one used above, can also be mounted on the back side of the ink pad at the same time that the edges are sealed. This further aids in the lateral distribution of the ink.

The finished capillary device manufactured in accordance with the foregoing was 50 to 55 mils in thickness of which 43 mils represents the polymeric matrix and the remaining thickness represents the matrix-encapsulated reinforcing member. The polymeric matrix had a density of about 0.22 gm/cc and a modulus of compressibility of about $2 \times 10^6$ dynes/cc. About 49% of the working surface area was open, having about 59,000 pores per square inch of average diameters from about 1.5 to 4 mils. The opposite (back) side of the matrix had a 46% open area, having pores averaging about 16 mils in diameter. This provides a ratio of pore diameters of the working surface to the opposite side in a range of from about 1:4 to 1:11 which appears optimum for this type of application. Air permeability through the pad averaged about 100 CFM as determined by ASTM D737-69.

Upon study of the distribution of the cells within the matrix, it was found that the following equation was applicable:

$$R = 0.7Y - 6 \times 10^{-3} Y^2 + 1.5$$

wherein R is the cell radius in mils and Y is the distance from the working surface in mils.

The ability of the capillary device to deliver ink can be measured by a test that determines dynamic ink delivery rate. In this test, the dynamic ink delivery rate in gm/cm$^2$ of copy/min was measured by using a fresh and fully inked capillary device properly fixed and tensioned on a clean standard A. B. Dick Model 530 mimeograph cylinder filled to the normal full level with A. B. Dick 3400 paste ink on an A. B. Dick Model 437 or equivalent mimeograph machine as follows:

1. 50 sheets of A. B. Dick Red Label B No. 43-2120 bond paper were preweighed to the nearest 0.005 gm.
2. With two minutes after (1), 50 impressions were run using the preweighed paper and a properly mounted A. B. Dick Type 1160 stencil prepared with a 10 cm × 10 cm window positioned to center the window on the test paper with machine adjustments as follows:
   8 pounds impression roll nip;
   standard composition 7¼ inches impression roll;
   impression roll and cylinder axes true to within a tolerance of −0.0″ to +0.010″ (the positive direction being that parallel to the direction of paper advance);
   66 copies per minute impression rate.
3. Within two minutes after (2), the test paper with ink impression was weighed to the nearest 0.005 gm.
4. The delivery rate was calculated as follows:
   $(gm_{final} - gm_{initial}) (13.2 \times 10^{-3})$ = delivery rate.

When so tested, the capillary device prepared in accordance with this Example I was found to have a dynamic ink delivery rate equal to $7 \times 10^{-2}$ gm/cm$^2$ of copy/minute yielding an ink delivery rate to air permeability ratio of $7 \times 10^{-4}$.

By way of comparision, a standard fabric ink pad (A. B. Dick No. 1784) had an ink delivery rate of only $4.5 \times 10^{-2}$ gm/cm$^2$ of copy/minute even though the permeability was greater (110 CFM). Note that here the ink delivery rate to air permeability ratio was only $4 \times 10^{-4}$.

Three additional capillary devices were made and tested as follows:

|  | Example II | Example III |
| --- | --- | --- |
| Thickness | 60 | 55 |
| Coating density (wet) | 0.32 | 0.38 |
| Ink delivery rate | $8.5 \times 10^{-2}$ | $5.7 \times 10^{-2}$ |
| Air permeability | 122 | 73 |
| Ink delivery to permeability ratio | $7 \times 10^{-4}$ | $8 \times 10^{-4}$ |

The ink delivery rate, in and of itself, is not always a meaningful number since, if the open area of a capillary device is sufficiently increased, almost any ink delivery rate can be achieved. What is significant, however, is the ability to achieve a desired rate of ink delivery without reliance on an increase in the open area of the capillary device to the extent that the device will not have sufficient capillarity to retain fluids over gravity forces. This concept can be expressed mathematically by the above-referred-to ratio of the dynamic ink delivery rate to the air permeability. It has been found that a ratio of at least $5 \times 10^{-4}$ or, more preferably, $6 \times 10^{-4}$, is desirable for capillary devices for stencil-printing machines.

It was found that pads meeting the above-described features have nearly optimum properties for a commercial mimeograph machine (A. B. Dick) under usual service conditions when used with a standard paced ink drum (25% open area for ink transmission) as well as a variety of other inks.

We claim:

1. A method for forming a resilient capillary device including the steps of:
   foaming an aqueous suspension of a resilient polymer;
   dissolving a sugar in the suspension;
   casting the foamed suspension into a desired configuration;
   heating the surface of the cast suspension rapidly to remove the water and rigidify the pores and cellular structure adjacent thereto more rapidly than the cells more remote from the surface;
   continuing the heating of the cast suspension until it is dried and fully rigidified; and
   removing the sugar from the rigidified structure, whereby it is rendered resilient.
2. A method according to claim 1 wherein the heating is achieved by infrared radiant energy.
3. A method according to claim 1 wherein the polymer is an elastomer.
4. A method according to claim 3 wherein the heating is continued until the elastomer is cured.
5. A method according to claim 1 wherein the polymer is a mixture of several polymers.
6. A method according to claim 5 wherein the mixture includes a vinyl resin.
7. A method according to claim 6 wherein the mixture includes an elastomer.
8. A method according to claim 7 wherein the elastomer is a rubber.
9. A method according to claim 1 wherein the ratio of the parts by weight sugar and the parts by weight polymer is in a range of from about 0.3 to about 1.0.

* * * * *